United States Patent [19]
Cornell

[11] 3,722,343
[45] Mar. 27, 1973

[54] MULTIPLE SAW LUMBER TRIMMER
[76] Inventor: Cyrus J. Cornell, Laceyville, Pa.
[22] Filed: June 23, 1971
[21] Appl. No.: 156,051

Related U.S. Application Data

[63] Continuation of Ser. No. 791,986, Jan. 17, 1969, abandoned.

[52] U.S. Cl..............83/422, 83/423, 83/425.4, 83/435, 198/178
[51] Int. Cl.............................................B27b 25/04
[58] Field of Search......143/49 R, 49 A, 49 B, 49 C, 143/49 F, 49 G, 37 A; 144/242 D; 198/178, 200; 83/422, 423, 425.4, 435

[56] References Cited

UNITED STATES PATENTS

| 3,416,643 | 12/1968 | Kotila | 143/49 R X |
| 1,795,953 | 3/1931 | Johnson | 143/49 UX |
| 1,802,514 | 4/1931 | Johnson | 143/49 X |
| 575,899 | 1/1897 | Myers | 143/49 D X |
| 1,241,871 | 10/1917 | Myers | 143/49 R |

Primary Examiner—Andrew R. Juhasz
Assistant Examiner—James F. Coan
Attorney—Richard S. Stephens

[57] ABSTRACT

A lumber trimming saw, the conveyor chains of which are provided with prongs located forwardly of each lumber engaging lug. The prongs are normally positioned below the conveyor rails out of engagement with a piece of lumber. As the lumber is advanced by the chain lugs into proximity with the saw, the chains are elevated to move the prongs into engagement with a piece of lumber while it is advanced past the saw. The prongs serve to anchor an area of the piece of lumber which is not engaged by the chain lugs due to warpage of the lumber. Chain guide and guard members are provided in overlying relation to the lower return runs of the conveyor chain.

9 Claims, 6 Drawing Figures

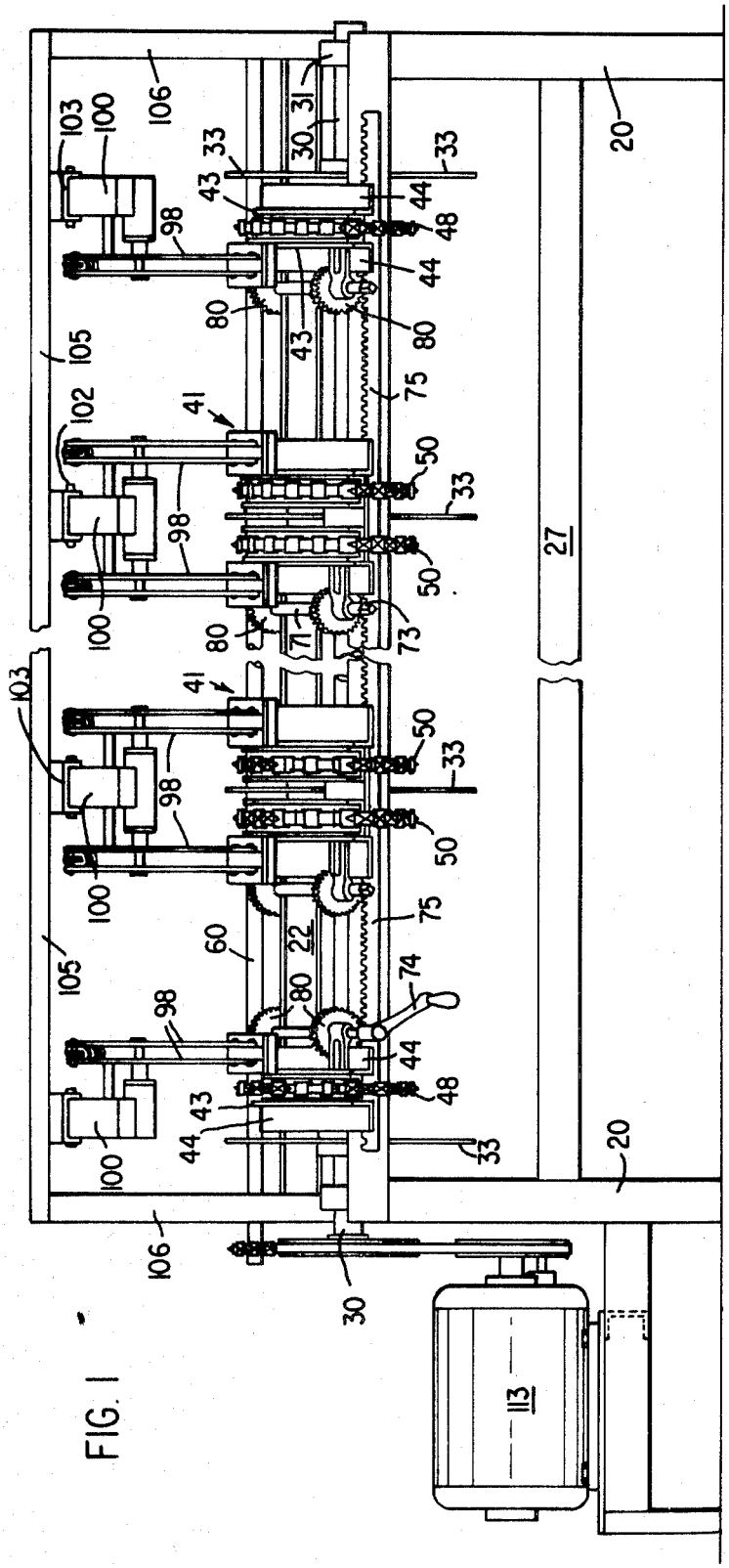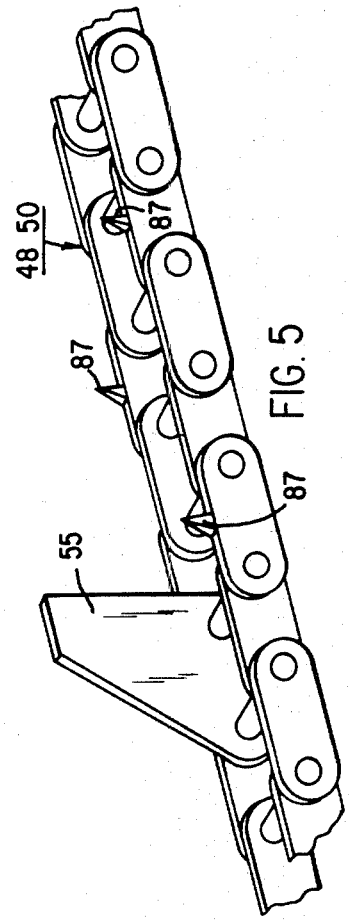

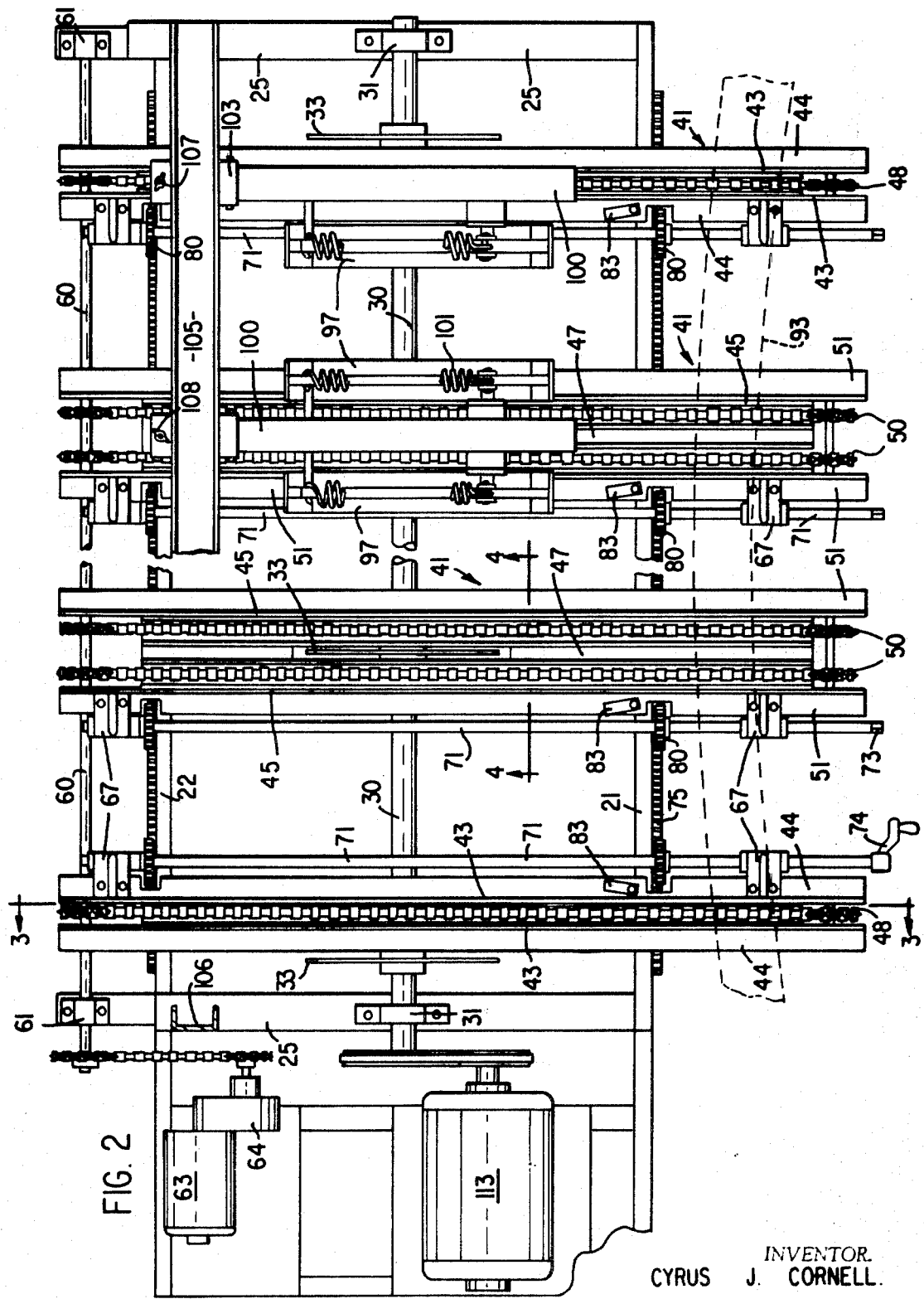

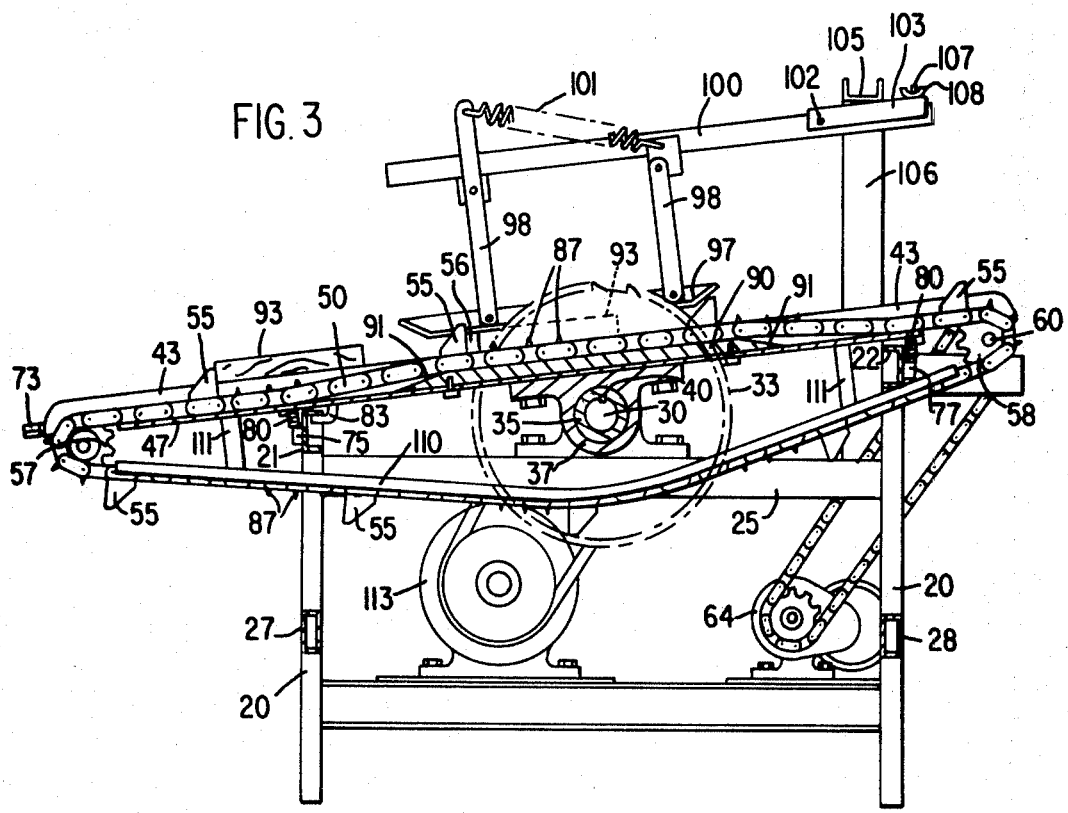
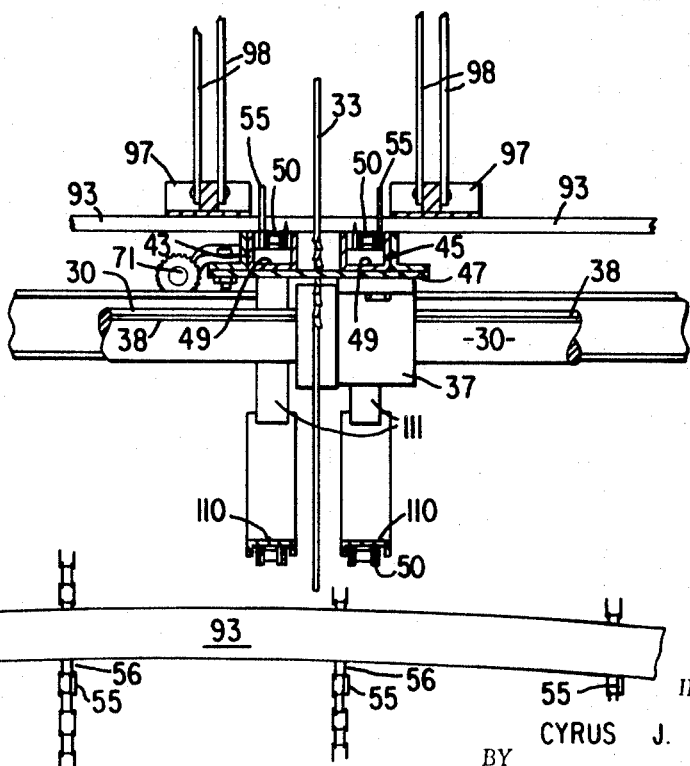

MULTIPLE SAW LUMBER TRIMMER

This application is a continuation of my copending application Ser. No. 791,986 filed Jan. 17, 1969, and now abandoned.

BACKGROUND OF THE INVENTION

Lumber trimming machines are employed to cut pieces of lumber, such as boards, into predetermined lengths. These trimmers are provided with two or more circle saws adjustable to vary the spacing therebetween. The piece of lumber is placed on transfer units, each of which includes a conveyor chain. The chains are provided with lugs which engage the rear edge of the board and advance it to and past the saws. These machines are generally used to cut pieces of lumber recently sawed from the log. On occasion, the pieces of lumber are warped, whereby an area of the piece, usually in the central portion thereof, is not engaged by a chain lug. When the warped piece is passed through the saw, the severed ends will move toward the chain lug. This movement causes the board to be clamped against the saw, with the result that the board is often thrown violently from the machine, and the operator may be seriously injured.

BRIEF SUMMARY OF THE INVENTION

The trimmer of my invention is provided with means to avoid the displacement of a warped piece of lumber while it is being sawed. This is brought about by providing the conveyor chains with upwardly extending sharp prongs located forwardly and adjacent each conveyor chain lug. These prongs are positioned below the supporting surface of the transfer rails out of engagement with the piece of lumber. Accordingly, the piece of lumber, as it is initially placed upon the transfer rails, can be moved by the operator to a desired position. As the piece of lumber is advanced by the conveyor chains, the chains are elevated to move the prongs upwardly into engagement with the under side of the piece of lumber and accordingly provide means for anchoring it to the chains during the sawing operation.

The invention also includes a combination chain guide and guard fixedly positioned over the lower run of the conveyor chains and serve to properly maintain the chain on the chain sprockets and prevent pieces of lumber and the like from colliding with the lower runs of the chains.

BRIEF DESCRIPTION OF DRAWINGS

FIG. 1 is a front elevational view of a lumber trimmer embodying my invention.
FIG. 2 is a top plan view, with parts broken away.
FIG. 3 is a view taken on line 3—3, FIG. 2.
FIG. 4 is a view taken on line 4—4, FIG. 2.
FIG. 5 is an enlarged perspective view of a section of one of the conveyor chains.
FIG. 6 is a plan view of a warped board.

DETAILED DESCRIPTION

The frame consists of vertically disposed leg members 20, to the upper ends of which is affixed upper front and rear members 21, 22. End members 25 extend between the leg members 20. Lower front and rear members 27, 28, also extend between the legs 20.

A shaft 30 extends lengthwise of the frame and is journalled in bearings 31 mounted on the end cross members 25. A plurality of circle saws 33 are mounted on the shaft 30.

The saws 33 are fixedly mounted on sleeves 35, which are journalled in bearing blocks 37 fixed to each transfer unit. The shaft 30 is formed with an elongated keyway 38, and the sleeves 35 are each provided with a key 40, see FIGS. 3 and 4. The transfer units are indicated generally at 41, there being four such units shown in FIGS. 1 and 2. Each of these units consists of a pair of rails, which may consist of the vertically disposed flanges 43 of angle irons 44, as in the transfer units at the ends of the machine, see FIGS. 1 and 2, or the rails may consist of the side flanges of channel members 45, as in the two transfer units in the central portion of the machine, as shown in FIGS. 1, 2 and 4. The angle iron rail members 43, 44, and also the channel members 45 are mounted on plates 47, which terminate in spaced relation to the ends of the rails, see FIG. 3. The plates 47 provide a support for the upper runs of the conveyor chains 48 extending between the rails 43. The bottom walls 49 of the channel members 45 provide the support for the upper runs of the chains 50 in the center transfer units. In these center units there are two sets of the channel rails 45 in each transfer unit, and the saws 33 mounted on shaft 30 extend upwardly through slots formed in plates 47 between the channel rails 45. The channel members 45 in these units are fixed to angle irons 51. The saws 33, associated with the end transfer units, are mounted at one side of the rails of said units, see FIGS. 1 and 2. The purpose of the double rail structure in the center units is to provide support for the ends of pieces severed by the saws in the center units. There is no support problem as to the end pieces cut from the board as they are of no appreciable length.

The conveyor chains 48, 50, are provided at spaced intervals therealong with driving lugs 55. These lugs extend upwardly a distance beyond the top edges of the rails 43, 45. The chains 48, 50, are trained over sprockets 57, 58, journalled between the rails at the ends of the transfer units. The sprockets 58 have a sliding key connection with a shaft 60 extending lengthwise of the frame and journalled in bearings 61 mounted on the rear ends of the cross end members 25. The shaft 60 is driven by a motor 63 through a gear reduction 64. The drive unit being mounted on an extension of the frame at the left end thereof, see FIGS. 1, 2 and 3.

With this arrangement, the transfer units 41 may be each moved in a direction lengthwise of the frame. Each transfer unit is provided with bearings 67, see FIG. 2, attached to the angle rail members 44 in the end transfer units, and to angles 51 in the center transfer units. Shafts 71 are journalled in the bearings 67. These shafts are provided with non-circular ends 73 at the front side of the machine to receive operating cranks 74.

There is a gear rack 75 fixed to the front frame member 21, and a gear rack 77 fixed to the rear member 22. The shafts 71 are provided with gears 80 arranged in mesh with the racks 75, 77. Accordingly, when the shafts are rotated by the crank 74, the transfer units are moved in a direction lengthwise of the machine. Each transfer unit is provided with a clamping member 83, the lower end of which extends under the upper flange of the frame member 21, see FIGS. 2 and 3. Prongs 87 are fixed to the chains 48, 50. These prongs extend upwardly from the upper runs of the chains, but terminate below the upper edges of the rails 41, 45, as indicated in the left portion of FIG. 3.

Cam members 90 are attached to the support plates 47 extending below the upper runs of the chains 48 and to the bottom walls 49 of the channel rails 50. These cam members are arranged in juxtaposition to the circle saws 33, see FIG. 3, and are formed at their ends with inclined surfaces 91. These cam members serve to elevate the chains 48, 50, to move the prongs 87 upwardly into engagement with the boards 93 prior to engagement of the leading edges of the boards by the circle saws 33. The cams are of sufficient length to maintain this prong engagement until after the board passes by the saws. Preferably, as shown in FIG. 5 of the drawings, there are a plurality of prongs 87 fixed to the chains forwardly of each of the pusher lugs 55. One prong of each set is fixed to a chain link at the side of the chain opposite to the location of the other prongs of the set.

On occasion the boards 93 are warped, as shown in FIG. 6, with the result that one or more portions of the board is not engaged at its rear edge by the chain lugs 55, as indicated at 56. When the warped board is passed through a circle saw 33 and is severed thereby, the adjacent ends of the board at the area of severance will move rearwardly, or toward the front of the machine. This causes the ends of the board to be cramped against the saw, with the result that the saw will throw the board toward the front of the machine. This situation is prevented by the prongs 87 which, as previously explained, are in engagement with the board during the cutting thereof by the saws and accordingly, the portion of the board not backed up by a pusher lug 55 is held from movement and is not displaced by the action of the saw.

As is conventional in machines of this type, hold-down members 97 are provided for holding the boards against the rails of the transfer units. These members are pivotally attached to the lower ends of links 98, pivotally connected at their upper ends to an arm 100. The links 98 are urged in a counterclockwise direction about their upper pivots by a tension spring 101, FIG. 3. The arm 100 is pivotally connected at 102 to a channel member 103 welded, or otherwise fixed, to a channel member 105 supported by uprights 106 fixed to the end cross members 25. The rear ends of the arms 100 are provided with bolts 107 extending through the web of the channel members 103 and provided with nuts 108. When the nuts 108 are removed from the bolts, the hold-down assembly may be swung upwardly for convenient servicing of the machine.

Channel members 110 are arranged in overlying relation to the lower runs of the chains 48, 50. The channel members 110 are carried by posts 111 depending from each transfer unit, see FIG. 3. The members 110 serve as guards to prevent pieces of the lumber, and other articles, from dropping onto the lower runs of the chain and to guide the lower runs onto the forward sprockets 57. The saw arbor shaft 30 is driven by a motor 113.

I claim:

1. In a multiple saw lumber trimmer having at least two saw blades spaced along a horizontal axis, conveyor rail supporting means for supporting a board as the board is advanced toward and past said saw blades, and a plurality of moving conveyor chains having lugs adapted to extend above said conveyor rail supporting means and push against an edge of said board to advance the board toward and past said saw blades, the combination of prong means carried on said conveyor chains ahead of said lugs, and means to move said prong means into engagement with said board after said lugs have moved said board a first distance toward said saw blades and while said board is being advanced a further distance past said saw blades to allow said lugs to rotate said board about a vertical axis while said board is being advanced through said first distance and to positively prevent rotation about said vertical axis of the section of said board between said two saw blades while said section is being advanced through said further distance even if one or more of said lugs fails to engage said edge of said board, thereby preventing said section of said board from jamming between said saw blades and being flung backwardly.

2. The combination according to claim 1 wherein a pair of said conveyor chains are provided between each adjacent pair of said saw blades with each of said conveyor chains of a pair being spaced closely adjacent one saw blade of an adjacent pair, whereby the prongs on a given pair of said conveyor chains engage the ends of the section of board between the adjacent pair to prevent said rotation of said section.

3. The combination according to claim 1 wherein one of said saw blades and two of said conveyor chains are mounted on a frame with said two conveyor chains on opposite sides of said one saw blade, and means for adjustably horizontally positioning said frame to selectively space said one saw blade and said two conveyor chains relative to the other saw blades and conveyor chains.

4. The combination according to claim 1 wherein each of said conveyor chains comprises an endless chain trained about a pair of sprockets and having upper and lower courses, each of said lugs on an upper course extending upwardly a first distance to extend above said conveyor rail supporting means, and each of said prongs on an upper course extending upwardly a second distance less than said first distance, and wherein said means to move said prongs into engagement with said board comprises ramp means for deviating a portion of the upper course of said chain upwardly so that the prongs of the deviated portion extend above said conveyor rail supporting means to engage said board.

5. The combination according to claim 1 having work-piece hold-down means resiliently biased to urge said board downwardly against said conveyor rail supporting means.

6. The combination according to claim 1 having a plurality of work-piece hold-down means resiliently biased to urge said board downwardly against said conveyor rail supporting means, each of said conveyor chains being horizontally spaced between one of said hold-down means and one of said saw blades.

7. The combination according to claim 1 wherein each of said conveyor chains has an upper course having first and second portions, said first portion of each chain extending relative to said conveyor rail supporting means so that said lugs extend above said supporting means and said prongs do not extend above said supporting means, whereby a board lying on said supporting means adjacent said first portion of said upper course may be rotated about a vertical axis and aligned as it is advanced toward said saws by the lugs on said conveyor chains, said second portion of each chain extending relative to said conveyor rail supporting means so that both said lugs and said prongs extend above said supporting means.

8. The combination according to claim 7 wherein said second portion of each of said conveyor chains extends rearwardly beyond a saw blade, whereby said prongs engage a section of said board at and after the time it is completely severed.

9. A multiple saw lumber trimmer, comprising, in combination: a pair of saw blades spaced along a horizontal axis; conveyor rail supporting means for supporting a board as the board is advanced toward and past said saw blades, said supporting means having upper edges defining a plane at which the underside of said board is situated; a plurality of moving conveyor chains having lugs adapted to extend above said plane and push against an edge of said board to advance the board toward and past said saw blades; prong means carried on said conveyor chains ahead of said lugs; and means for moving said prong means from a level below said plane in a direction substantially perpendicular to said plane and into engagement with the underside of said board while said board is being advanced past said saw blades to positively prevent rotation about a vertical axis of the section of board between said saw blades and thereby prevent said section of said board from jamming between said saw blades.

* * * * *